US012798415B2

(12) United States Patent
Jang et al.

(10) Patent No.: US 12,798,415 B2
(45) Date of Patent: Nov. 17, 2026

(54) APPARATUS FOR DIAGNOSING RELAY IN VEHICLE OBC, METHOD THEREFOR, AND BATTERY CHARGING APPARATUS INCLUDING SAME

(71) Applicants: Hyundai Motor Company, Seoul (KR); Kia Corporation, Seoul (KR)

(72) Inventors: Young Jin Jang, Seoul (KR); Sung Hwan Kim, Anyang-si (KR); Won Yong Sung, Hwaseong-si (KR); Dong Jun Lee, Suwon-si (KR); Hye Seung Kim, Gunpo-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 515 days.

(21) Appl. No.: 18/508,754

(22) Filed: Nov. 14, 2023

(65) Prior Publication Data

US 2025/0018810 A1 Jan. 16, 2025

(30) Foreign Application Priority Data

Jul. 14, 2023 (KR) ........................ 10-2023-0091962

(51) Int. Cl.
*B60L 53/24* (2019.01)
*B60L 53/22* (2019.01)
*H02J 7/04* (2006.01)

(52) U.S. Cl.
CPC ............... *B60L 53/24* (2019.02); *B60L 53/22* (2019.02); *H02J 7/04* (2013.01); *B60L 2210/10* (2013.01)

(58) Field of Classification Search
CPC ...... B60L 53/24; B60L 53/22; B60L 2210/10; B60L 53/20; H02J 7/04; Y02T 10/7072; G01R 31/327; G01R 31/006; G01R 31/3274; G01R 19/0084; G01R 31/3275
USPC .......................................................... 320/104
See application file for complete search history.

(56) References Cited

U.S. PATENT DOCUMENTS 5,198,808 A * 3/1993 Kudo ........................ H04Q 1/24 379/291
8,035,536 B2 * 10/2011 Ye ........................ H02M 1/4233 323/283
8,669,739 B2 * 3/2014 Ohtomo .................... B60L 3/12 320/132
9,352,662 B2 * 5/2016 Kaneyasu ............... B60L 53/30
(Continued)

FOREIGN PATENT DOCUMENTS

CN 106585385 A * 4/2017 .............. H02J 7/685
CN 217935067 U * 11/2022 ............... H02H 3/20
CN 115730268 A * 3/2023

*Primary Examiner* — M Baye Diao
(74) *Attorney, Agent, or Firm* — Slater Matsil, LLP

(57) ABSTRACT

The present disclosure relates to techniques for diagnosing a relay in a vehicle on-board charger (OBC), and an apparatus for diagnosing a relay in a vehicle OBC according to an exemplary embodiment may include first to third voltage sensors configured to measure phase-specific voltages for AC inputs to the relay circuit unit, fourth and fifth voltage sensors configured to measure line voltages for AC outputs from the relay circuit unit, and a diagnosis module configured to diagnose the relay circuit unit, based on the phase-specific voltages measured by the first to third voltage sensors and based on the line voltages measured by the fourth and fifth voltage sensors.

20 Claims, 8 Drawing Sheets

(56) References Cited

U.S. PATENT DOCUMENTS

| | | | | |
|---|---|---|---|---|
| 9,886,802 | B2 * | 2/2018 | Ishii | B60L 3/04 |
| 2014/0288772 | A1 * | 9/2014 | Makabe | G07C 5/0808 701/36 |
| 2022/0239096 | A1 * | 7/2022 | Goto | B60R 16/033 |

* cited by examiner

APPARATUS FOR DIAGNOSING RELAY IN VEHICLE OBC, METHOD THEREFOR, AND BATTERY CHARGING APPARATUS INCLUDING SAME

CROSS-REFERENCE TO RELATED APPLICATIONS

This application claims the benefit of Korean Patent Application No. 10-2023-0091962, filed on Jul. 14, 2023, which application is hereby incorporated herein by reference.

TECHNICAL FIELD

The present disclosure relates to relay diagnosis technology.

BACKGROUND

Vehicle-to-grid (V2G) refers to a function of supplying electricity to a grid power unit by using a high-voltage battery of a vehicle. Utilizing V2G makes it possible for consumers to earn additional profits from electricity sale and for electricity sellers to utilize a high-voltage battery of a vehicle practically as an electric power storage system (ESS) by storing and efficiently using electricity in the high-voltage battery.

V2G may be achieved through communication between an on-board charger (OBC) (or a two-way slow charger), a vehicle charging management system (VCMS), and electric vehicle supply equipment (EVES).

Network and system protection (NS protection) is legally enforced on V2G for safety reasons. When a relay in an OBC does not normally operate for reasons such as fusion, it is impossible to normally perform the NS protection, and thus diagnosis of failure of the relay in the OBC is very important. Therefore, a technique for diagnosing failure of a relay in an OBC is required.

Accordingly, a technique for diagnosing failure of a relay in an OBC by using a voltage sensor for relay diagnosis has been proposed, in which a voltage sensor for relay diagnosis needs to be additionally located, incurring an increase in cost.

The foregoing background art is technical information possessed by an inventor of the present disclosure to derive the present disclosure or obtained in the process of deriving the present disclosure, and cannot necessarily be said to be a known technique disclosed to the general public prior to the filing of the present disclosure.

SUMMARY

The present disclosure relates to a relay diagnosis technology and, more particularly to an apparatus for diagnosing a relay in a vehicle on-board charger (OBC), a method therefor, and a battery charging apparatus including the same.

Exemplary embodiments disclosed herein can solve the above-mentioned problems, and accordingly, an exemplary embodiments provides an apparatus for diagnosing a relay in a vehicle OBC that is capable of diagnosing a relay (as fused or open) by operating the relay in an OBC at the beginning of operation, a method therefor, and a battery charging apparatus including the same.

An exemplary embodiments provides an apparatus for diagnosing a relay in a vehicle OBC that is capable of diagnosing a relay in an OBC by using a voltage sensor (e.g., an input phase voltage sensor or a PFC line voltage sensor) previously mounted for control or power identification without adding a component, such as a voltage sensor for relay diagnosis, a method therefor, and a battery charging apparatus including the same.

An exemplary embodiments provides an apparatus for diagnosing a relay in a vehicle OBC that is capable of performing at least one of relay diagnosis in an L1 phase operation, relay diagnosis in an L1-L2 phase operation, relay diagnosis in an L1-L3 phase operation, and relay diagnosis in a three-phase operation, a method therefor, and a battery charging apparatus including the same.

The technical subjects of the present disclosure may not be limited to the above-mentioned technical subjects, and other technical subjects intended by the present disclosure may be clearly understood, through the following descriptions, by those skilled in the art to which the present disclosure pertains.

In an embodiment, there may be provided an apparatus for diagnosing a relay in a vehicle on-board charger (OBC) that is capable of diagnosing a relay in an OBC, a method therefor, and a battery charging apparatus including the same.

An apparatus for diagnosing a relay in a vehicle OBC according to an exemplary embodiment of the present disclosure may be an apparatus for diagnosing a relay circuit unit provided in a vehicle OBC and including a plurality of relays.

According to an exemplary embodiment, the apparatus for diagnosing the relay in the vehicle OBC may include a first voltage sensor to a third voltage sensor configured to measure a phase-specific voltage for an AC input to the relay circuit unit, a fourth voltage sensor and a fifth voltage sensor configured to measure a line voltage for an AC output from the relay circuit unit, and a diagnosis module configured to diagnose the relay circuit unit, based on the phase-specific voltage measured by the first to third voltage sensors and the line voltage measured by the fourth and fifth voltage sensors.

According to an exemplary embodiment, the first voltage sensor to the third voltage sensor may measure voltages for an L1 phase to an L3 phase input, respectively, through first to third AC input terminals, respectively.

According to an exemplary embodiment, the fourth voltage sensor may measure an L1-L3 line voltage between the L1 phase output through a first AC output terminal and the L3 phase output through a third AC output terminal.

According to an exemplary embodiment, the fifth voltage sensor may measure an L2-L3 line voltage between the L2 phase output through a second AC output terminal and the L3 phase.

According to an exemplary embodiment, the relay circuit unit may include a precharge relay and an L1 relay disposed in parallel between a first AC input terminal to which an L1 phase voltage is input and a first AC output terminal from which the L1 phase voltage is output, an L1-L2 relay disposed between the first AC input terminal and a second AC output terminal from which an L2 phase voltage is output, an L2 relay disposed between a second AC input terminal to which the L2 phase voltage is input and the second AC output terminal, an L3 relay disposed between a third AC input terminal to which an L3 phase voltage is input and a third AC output terminal from which the L3 phase voltage is output, and a neutral relay disposed between a ground and the third AC output terminal.

According to an exemplary embodiment, the diagnosis module may perform at least one of relay diagnosis in an L1 phase operation, relay diagnosis in an L1-L2 phase operation, relay diagnosis in an L1-L3 phase operation, and relay diagnosis in a three-phase operation.

According to an exemplary embodiment, the diagnosis module may diagnose an open state and a fused state of a neutral relay, an open state and a fused state of an L1 relay, an open state and a fused state of a precharge relay, and an open state and a fused state of an L1-L2 relay by performing relay diagnosis in an L1 phase operation.

According to an exemplary embodiment, the diagnosis module may diagnose an open state and a fused state of a precharge relay, an open state and a fused state of an L1 relay, an open state and a fused state of an L2 relay, a fused state of a neutral relay, and a fused state of an L1-L2 relay by performing relay diagnosis in an L1-L2 phase operation.

According to an exemplary embodiment, the diagnosis module may diagnose an open state and a fused state of an L1 relay, an open state and a fused state of a precharge relay, an open state and a fused state of an L3 relay, an open state of an L2 relay, and a fused state of a neutral relay by performing relay diagnosis in an L1-L3 phase operation.

According to an exemplary embodiment, the diagnosis module may diagnose an open state and a fused state of a precharge relay, an open state and a fused state of an L1 relay, an open state and a fused state of an L2 relay, an open state and a fused state of an L3 relay, a fused state of an L1_L2 relay, and a fused state of a neutral relay by performing relay diagnosis in a three-phase operation.

According to an exemplary embodiment, when performing relay diagnosis in an L1 phase operation, the diagnosis module may perform the relay diagnosis, based on voltages measured as a precharge relay is turned on, a neutral relay is turned on, the precharge relay is turned off, an L1 relay is turned on, and an L1-L2 relay is turned on, in order.

According to an exemplary embodiment, when performing relay diagnosis in an L1-L2 phase operation, the diagnosis module may perform the relay diagnosis, based on voltages measured as a precharge relay is turned on, an L2 relay is turned on, the precharge relay is turned off, and an L1 relay is turned on, in order.

According to an exemplary embodiment, when performing relay diagnosis in an L1-L3 phase operation, the diagnosis module may perform the relay diagnosis, based on voltages measured as a precharge relay is turned on, an L3 relay is turned on, the precharge relay is turned off, and an L1 relay is turned on, in order.

According to an exemplary embodiment, when performing relay diagnosis in a three-phase operation, the diagnosis module may perform the relay diagnosis, based on voltages measured as a precharge relay is turned on, an L3 relay is turned on, the precharge relay is turned off, an L1 relay and an L2 relay are turned on, and an L1_L2 relay is turned on, in order.

According to an exemplary embodiment, when determining diagnosis of an abnormality of a random relay while diagnosing the plurality of relays in the relay circuit unit, the diagnosis module may terminate a diagnosis operation without performing a process after determining the diagnosis of the abnormality.

A method for diagnosing a relay in a vehicle OBC according to an exemplary embodiment of the present disclosure may be a method for diagnosing a relay circuit unit provided in a vehicle OBC and including a plurality of relays.

According to an exemplary embodiment, the method for diagnosing the relay in the vehicle OBC may include measuring a phase-specific voltage for an AC input to the relay circuit unit by using a first voltage sensor to a third voltage sensor, measuring a line voltage for an AC output from the relay circuit unit by using a fourth voltage sensor and a fifth voltage sensor, and diagnosing the relay circuit unit, based on the phase-specific voltage measured by the first to third voltage sensors and the line voltage measured by the fourth and fifth voltage sensors.

According to an exemplary embodiment, the method for diagnosing the relay in the vehicle OBC may include performing at least one of relay diagnosis in an L1 phase operation, relay diagnosis in an L1-L2 phase operation, relay diagnosis in an L1-L3 phase operation, and relay diagnosis in a three-phase operation, based on the phase-specific voltage and the line voltage.

According to an exemplary embodiment, in the method for diagnosing the relay in the vehicle OBC, when performing relay diagnosis in an L1 phase operation, the relay diagnosis may be performed based on voltages measured as a precharge relay is turned on, a neutral relay is turned on, the precharge relay is turned off, an L1 relay is turned on, and an L1-L2 relay is turned on, in order.

According to an exemplary embodiment, in the method for diagnosing the relay in the vehicle OBC, when performing relay diagnosis in an L1-L2 phase operation, the relay diagnosis may be performed based on voltages measured as a precharge relay is turned on, an L2 relay is turned on, the precharge relay is turned off, and an L1 relay is turned on, in order.

According to an exemplary embodiment, in the method for diagnosing the relay in the vehicle OBC, when performing relay diagnosis in an L1-L3 phase operation, the relay diagnosis may be performed based on voltages measured as a precharge relay is turned on, an L3 relay is turned on, the precharge relay is turned off, and an L1 relay is turned on, in order.

According to an exemplary embodiment, in the method for diagnosing the relay in the vehicle OBC, when performing relay diagnosis in a three-phase operation, the relay diagnosis may be performed based on voltages measured as a precharge relay is turned on, an L3 relay is turned on, the precharge relay is turned off, an L1 relay and an L2 relay are turned on, and an L1_L2 relay is turned on, in order.

According to an exemplary embodiment, in the method for diagnosing the relay in the vehicle OBC, an open state and a fused state of a neutral relay, an open state and a fused state of an L1 relay, an open state and a fused state of a precharge relay, and an open state and a fused state of an L1-L2 relay may be diagnosed by performing relay diagnosis in an L1 phase operation.

According to an exemplary embodiment, in the method for diagnosing the relay in the vehicle OBC, an open state and a fused state of a precharge relay, an open state and a fused state of an L1 relay, an open state and a fused state of an L2 relay, a fused state of a neutral relay, and a fused state of an L1-L2 relay may be diagnosed by performing relay diagnosis in an L1-L2 phase operation.

According to an exemplary embodiment, in the method for diagnosing the relay in the vehicle OBC, an open state and a fused state of an L1 relay, an open state and a fused state of a precharge relay, an open state and a fused state of an L3 relay, an open state of an L2 relay, and a fused state of a neutral relay may be diagnosed by performing relay diagnosis in an L1-L3 phase operation.

According to an exemplary embodiment, in the method for diagnosing the relay in the vehicle OBC, an open state and a fused state of a precharge relay, an open state and a fused state of an L1 relay, an open state and a fused state of an L2 relay, an open state and a fused state of an L3 relay, a fused state of an L1_L2 relay, and a fused state of a neutral relay may be diagnosed by performing relay diagnosis in a three-phase operation.

According to an exemplary embodiment, in the method for diagnosing the relay in the vehicle OBC, when determining diagnosis of an abnormality of a random relay while diagnosing the plurality of relays in the relay circuit unit, a diagnosis operation may be terminated without performing a process after determining the diagnosis of the abnormality.

A battery charging apparatus according to an exemplary embodiment of the present disclosure may include an input circuit including a relay circuit unit including a plurality of relays and a relay diagnosis unit configured to diagnose the relay circuit unit.

According to an exemplary embodiment, the relay diagnosis unit may be the apparatus for diagnosing the relay according to the exemplary embodiment of the present disclosure.

According to an exemplary embodiment, the relay diagnosis unit may perform diagnosis, based on voltages measured by controlling an operation of the plurality of relays in the relay circuit unit.

In addition to the above-mentioned solutions to the technical subjects, detailed particulars according to various embodiments of the present disclosure are included in the following description and the accompanying drawings.

According to an exemplary embodiment of the present disclosure, there may be provided an apparatus for diagnosing a relay in a vehicle on-board charger (OBC) that is capable of diagnosing a relay in a vehicle OBC, a method therefor, and a battery charging apparatus including the same.

According to an exemplary embodiment, because the relay in the OBC is diagnosed at the beginning of operation, it is possible to prevent an operation of the relay in a faulty state, thus preventing an abnormal operation of the OBC due to the operation of the relay in the faulty state.

Further, because the relay in the OBC may be diagnosed by using a voltage sensor (e.g., an input phase voltage sensor or a PFC line voltage sensor) previously mounted for control or power identification, it is possible to diagnose the relay in the OBC without adding a component, such as a voltage sensor for relay diagnosis. Accordingly, it is possible to solve an increase in cost that occurs when a sensor for diagnosing a relay is separately installed.

In addition, according to an exemplary embodiment, at least one of relay diagnosis in an L1 phase operation, relay diagnosis in an L1-L2 phase operation, relay diagnosis in an L1-L3 phase operation, and relay diagnosis in a three-phase operation may be performed, thus making it possible to diagnose a relay according to various operation types.

Advantageous effects of the present disclosure may not be limited to the above-mentioned effects, and other effects which are not mentioned may be clearly understood, through the following descriptions, by those skilled in the art to which the present disclosure pertains.

The above-mentioned subjects to be solved, solutions thereto, and advantageous effects are not intended to specify essential features of the claims, and thus the scope of protection of the claims is not necessarily limited by the description of the contents of the present disclosure.

BRIEF DESCRIPTION OF THE DRAWINGS

The accompanying drawings are present to assist understanding of exemplary embodiments of the present disclosure, and provide exemplary embodiments along with a detailed description. However, technical features of the exemplary embodiments are not limited to a specific drawing, and features disclosed in the respective drawings may be combined with each other to form a new exemplary embodiment. The above and other features and other advantages of an embodiment of the present disclosure can be more clearly understood from the following detailed description taken in conjunction with the accompanying drawings, in which.

DETAILED DESCRIPTION OF ILLUSTRATIVE EMBODIMENTS

Figure 1:
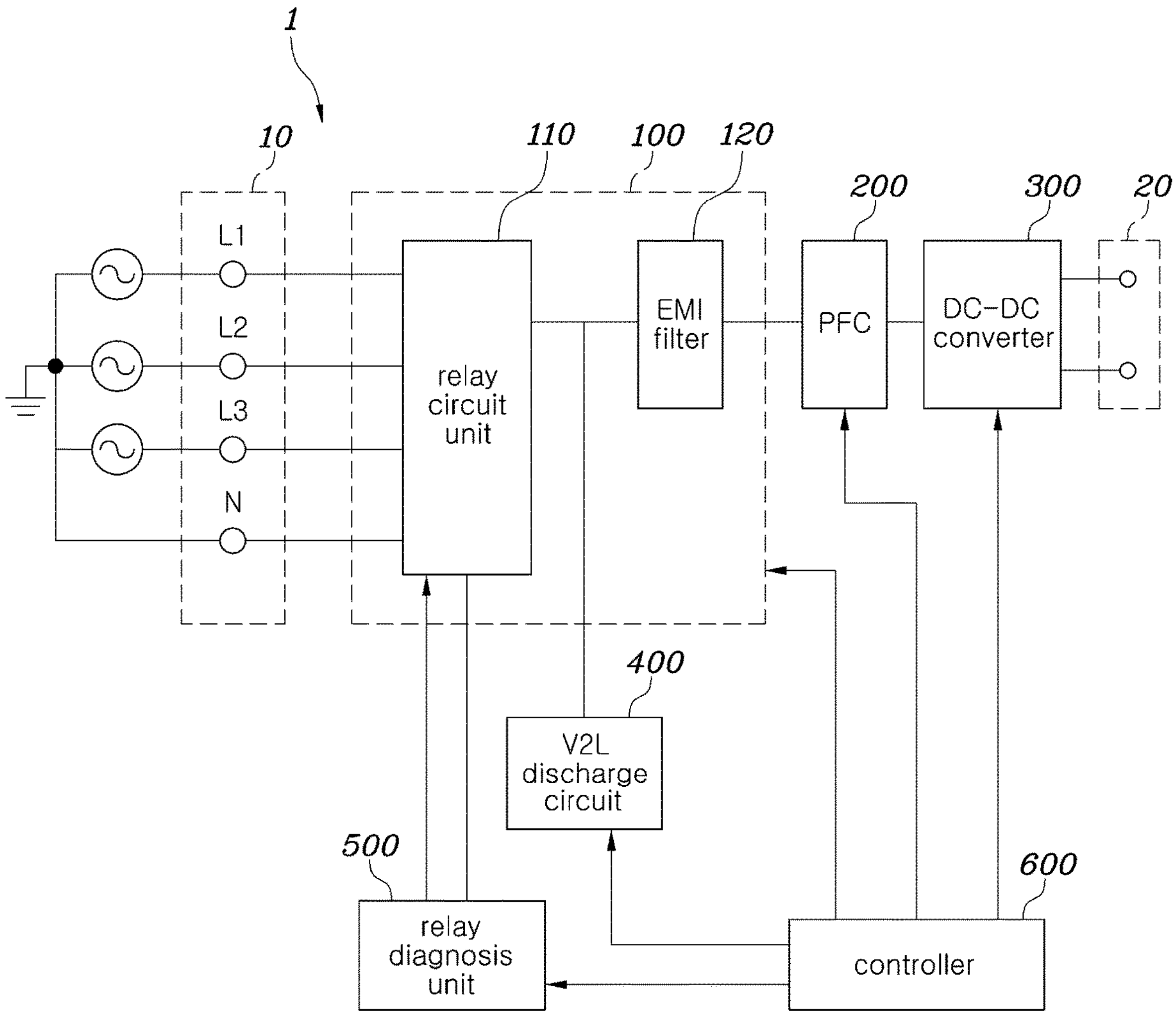
FIG. 1 illustrates a configuration of a battery charging apparatus according to an exemplary embodiment of the present disclosure.

The advantages and features of the disclosure and ways to achieve them can be apparent by making reference to embodiments as described below in detail in conjunction with the accompanying drawings. However, the disclosure is not necessarily limited to the embodiments set forth below, but may be implemented in various different forms. The following embodiments are provided only to completely disclose the disclosure and inform those skilled in the art of the scope of the disclosure, and the disclosure is defined only by the scope of the appended claims.

Shapes, sizes, ratios, angles, and numbers disclosed in the drawings for explanation of embodiments of the present disclosure are provided merely by way of example, and thus the present disclosure is not necessarily limited to those illustrated in the drawings. The same or like reference signs can designate the same or like elements throughout the specification. Furthermore, in describing the present disclosure, when it is determined that the detailed description of the known relevant arts unnecessarily obscures the subject matter of the present disclosure, the detailed description can be omitted. In the case where the expressions "comprise," "have," and "include" mentioned in the specification are used, another part may be added unless the term "only" is used. An element expressed in a singular form may include plural forms unless definitely indicated otherwise.

In construing an element, the element can be construed as covering an error range although there is no explicit description of the error range.

In describing a temporal relationship, when a temporal order is described using, for example, "after," "subsequent to," "next to," or "before," the temporal order may include cases which are not continuous unless the term "just" or "immediately" is used.

The terms "first," "second," and the like may be used to describe various elements, but the elements are not necessarily limited by these terms. These terms can be used merely to distinguish one element from the others. Therefore, a first element as used in the following description may be a second element without departing from the spirit of the present disclosure.

In describing the elements of the present disclosure, such terms as "first," "second," "A," "B," "(a)," and "(b)" may be used. These terms can be used merely to discern the corresponding elements from the other elements, and the essence, sequence, order, or number of the corresponding elements are not necessarily limited by the terms. It can be understood that when an element is referred to as being "connected to" or "coupled to" another element, the element may be directly connected to or coupled to the other element, but yet another element may be interposed between the respective elements that may be connected or coupled indirectly to each other.

The term "at least one" should be understood as including any or all combinations of one or more of the associated elements enumerated. For example, "at least one of a first element, a second element, and a third element" may mean not only the first element, the second element, or the third element, but also all combinations of two or more of the first element, the second element, and the third element.

The respective features of various embodiments of the present disclosure may be partially or entirely coupled to or combined with each other and may be technically linked and inter-operated with each other in various manners, and the respective embodiments of the present disclosure may be carried out independently of each other or may be carried out in association with each other.

Hereinafter, embodiments of the present disclosure will be described in detail with reference to the accompanying drawings and the embodiments set forth herein. For the convenience of description, the scale of elements illustrated in the drawings may differ from the real scale, and thus the elements are not necessarily limited by the scale illustrated in the drawings.

Hereinafter, an apparatus for diagnosing a relay in a vehicle OBC, a method for the same, and a battery charging apparatus including the same according to an exemplary embodiment of the present disclosure will be described with reference to the accompanying drawings.

FIG. 1 illustrates a configuration of a battery charging apparatus 1 according to an exemplary embodiment of the present disclosure.

Referring to FIG. 1, the battery charging apparatus 1 according to the exemplary embodiment of the present disclosure may be a bidirectional OBC mounted on a vehicle.

The battery charging apparatus 1 according to the exemplary embodiment may include an input circuit 100, a power factor correction circuit (PFC) 200, a DC/DC converter 300, a vehicle-to-load (V2L) discharge circuit 400, a relay diagnosis unit (or relay diagnosis apparatus) 500, and a controller 600, but the configuration of the battery charging apparatus 1 is not necessarily limited thereto.

The input circuit 100 according to an exemplary embodiment may operate under control of the controller 600, may input AC power through a charge/discharge port 10, and may output AC power to the PFC 200 after the input circuit 100.

For example, the input circuit 100 may be located between or connected to the charge/discharge port 10 and the PFC 200.

The charge/discharge port 10 may include a first AC input terminal L1, a second AC input terminal L2, a third AC input terminal L3, and a neutral terminal N, and may support a battery charging mode and a battery discharging mode.

In an exemplary embodiment, the first AC input terminal L1 may be a terminal to which an L1 phase AC voltage is input, the second AC input terminal L2 may be a terminal to which an L2 phase AC voltage is input, and the third AC input terminal L3 may be a terminal to which an L3 phase AC voltage is input.

For example, the first AC input terminal L1 to the third AC input terminal L3 may be located between an external AC power source and the input circuit 100, and may transmit input external AC power to the input circuit 100, and the neutral terminal N may be located between a ground and the input circuit 100.

In an exemplary embodiment, AC power may be a single-phase AC power source or a three-phase AC power source.

The input circuit 100 may include a relay circuit unit 110 and an electromagnetic interference (EMI) filter 120, and a configuration of the input circuit 100 is not necessarily limited thereto.

The relay circuit unit 110 may be located between the charge/discharge port 10 and the EMI filter 120, and the EMI filter 120 may be located between the relay circuit unit 110 and the PFC 200.

The relay circuit unit 110 may include relays that are turned on/off in response to control of the controller 600, and may transmit an AC input through the charge/discharge port 10 to the EMI filter 120 through a relay-on operation and a relay-off operation.

According to an exemplary embodiment, the relay circuit unit 110 may be controlled by the relay diagnosis unit 500 that performs relay diagnosis.

The EMI filter 120 may remove electrical noise included in an AC voltage transmitted from the relay circuit unit 110.

A detailed description of the relay circuit unit 110 according to an exemplary embodiment of the present disclosure will be described below with reference to FIG. 2.

The PFC 200 may be located between the input circuit 100 and a DC-DC converter 300, and may operate under control of the controller 600.

The PFC 200 may convert an AC voltage transmitted from the input circuit 100 into a DC voltage to output the DC voltage, and may correct the power factor of a voltage. That is, the PFC 200 may perform a rectifying function of converting an AC voltage into a DC voltage, and may increase a power factor by reducing a phase difference between an input current and an input voltage.

The DC-DC converter 300 may be disposed between the PFC 200 and an output terminal 20, and may operate under control of the controller 600 to receive a DC voltage output from the PFC 200 and to convert the size of the received DC voltage.

For example, the DC-DC converter 300 may include a full-bridge and/or half-bridge structure, but a structure of the DC-DC converter 300 is not necessarily limited thereto.

The DC-DC converter 300 may charge a battery (not shown) by outputting a DC voltage through the output terminal 20 connected to the battery.

The V2L discharge circuit 400 may be disposed between the relay circuit unit 110 and the EMI filter 120, and may operate under control of the controller 600 to perform vehicle-to-load (V2L) discharge.

The relay diagnosis unit (or relay diagnosis apparatus) 500 may be connected to the input circuit 100, and may operate under control of the controller 600 to diagnose the relay circuit unit 110 in the input circuit 100.

For example, the relay diagnosis unit 500 may determine a state (fused state, open state, and the like) of a relay through diagnosis.

According to an exemplary embodiment, the relay diagnosis unit 500 may control the relay circuit unit 110 to diagnose the relay circuit unit 110.

The relay diagnosis unit 500 may diagnose a relay, based on a voltage within the relay circuit unit 110 measured according to control, and may output a diagnosis result to the controller 600.

According to an exemplary embodiment, the relay diagnosis unit 500 may only diagnose the relay circuit unit 110, based on a voltage measured with respect to the relay circuit unit 110, without controlling the relay circuit unit 110.

According to an exemplary embodiment, the relay diagnosis unit 500 may diagnose the relay circuit unit 110 while controlling the relay circuit unit 110 according to a diagnosis type.

For example, the relay diagnosis unit 500 may control the relay circuit unit 110 according to a case of relay diagnosis in a single-phase operation, a case of relay diagnosis in a two-phase (L1-L2 or L1-L3) operation, and a case of relay diagnosis in a three-phase operation.

The relay diagnosis unit 500 may store a relay control algorithm for each diagnosis type and a relay diagnosis algorithm.

A detailed description of the relay diagnosis unit 500 according to an exemplary embodiment of the present disclosure will be described below with reference to FIG. 3.

The controller 600 may control an operation of other components 100, 200, 300, 400, and 500 in the battery charging apparatus 1, may enable the battery charging apparatus 1 to charge the battery, based on external AC power (battery charging mode), and may enable power of the battery to be discharged through at least one of the charge/discharge port 10 or the V2L discharge circuit 400 (battery discharging mode).

Although not shown in the drawings, the controller 600 may include a communication device that communicates with a different controller or a sensor to control a function of which the controller 600 is in charge, a memory that stores an operating system or input and output information, such as a logic command, and at least one processor that performs determination, calculation, and decision necessary to control the function of which the controller 600 is in charge.

Although the exemplary embodiment of FIG. 1 shows that the relay diagnosis unit 500 is provided separately from the controller 600, embodiments of the present disclosure are not limited thereto. For example, the relay diagnosis unit 500 may be configured inside the controller 600. Alternatively, the controller 600 may be configured to perform one or more functions of the relay diagnosis unit 500.

According to an exemplary embodiment, the controller 600 may control the relay circuit unit 110 so that the relay diagnosis unit 500 may measure voltages required for relay diagnosis.

Figure 2:
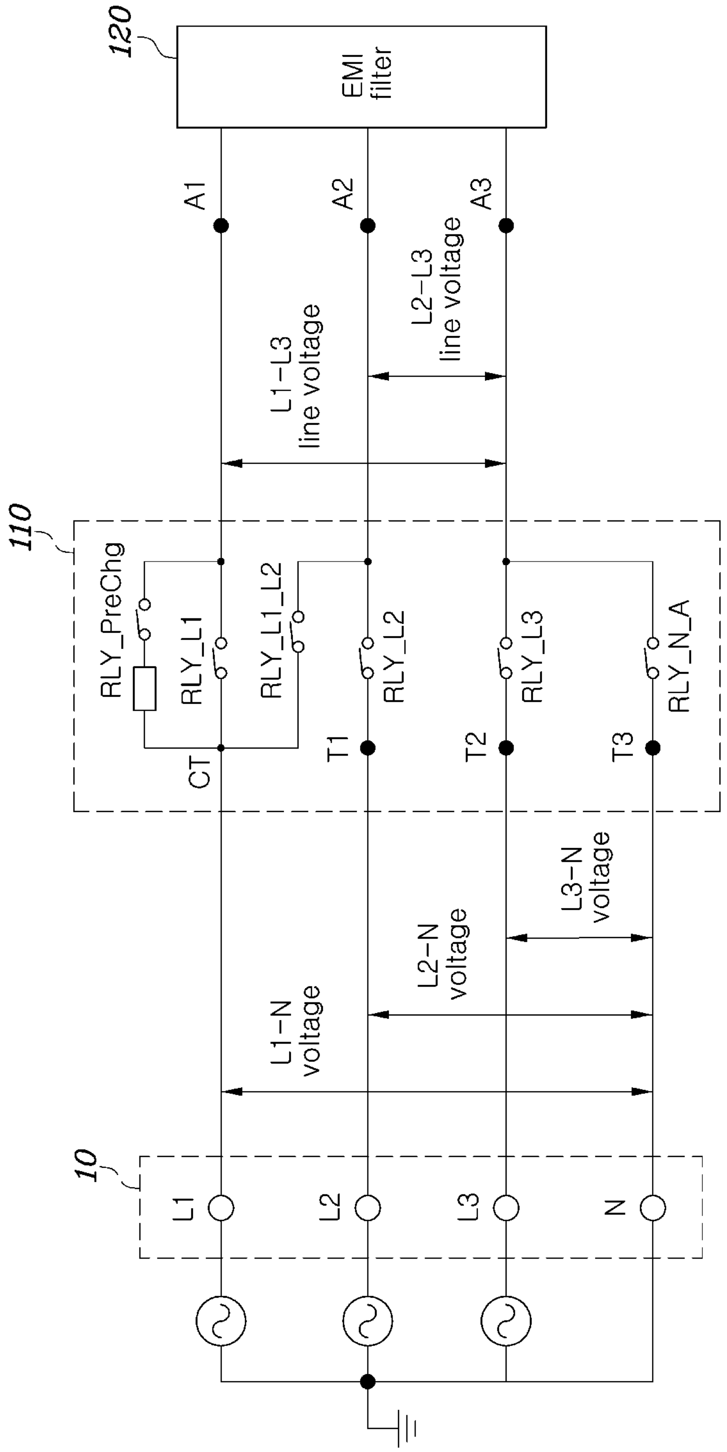
FIG. 2 illustrates a detailed structure of a relay circuit unit of an input circuit according to an exemplary embodiment of the present disclosure.
Figure 3:
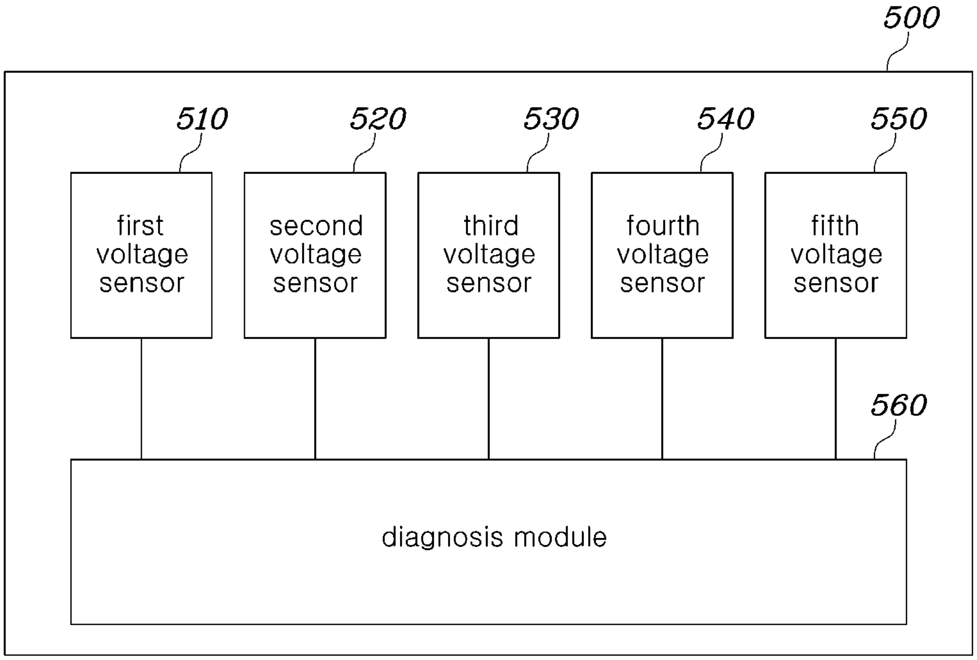
FIG. 3 illustrates a detailed structure of a diagnosis unit according to an exemplary embodiment of the present disclosure.

FIG. 2 illustrates a detailed structure of the relay circuit unit 110 of the input circuit 100 according to an exemplary embodiment of the present disclosure, and FIG. 3 illustrates a detailed structure of the relay diagnosis unit 500 according to an exemplary embodiment of the present disclosure.

Referring to FIG. 1 to FIG. 3, the relay circuit unit 110 of the input circuit 100 may include a plurality of relays located (or connected) in parallel between the charge/discharge port 10 and the EMI filter 120.

According to an exemplary embodiment, the relay circuit unit 110 may include a precharge relay RLY_PreChg, an L1 relay RLY_L1, an L1-L2 relay RLY_L1_L2, an L2 relay RLY_L2, an L3 relay RLY_L3, and a neutral relay (RLY_N_A), but a configuration of the relay circuit unit 110 is not necessarily limited thereto.

The precharge relay RLY_PreChg may be located in series between the first AC input terminal L1 of the charge/discharge port 10 and a first AC output terminal A1 of the relay circuit unit 110, and the L1 relay RLY_L1 also may be located in series between the first AC input terminal L1 of the charge/discharge port 10 and the first AC output terminal A1 of the relay circuit unit 110.

Accordingly, the precharge relay RLY_PreChg and the L1 relay RLY_L1 may be located in parallel between the first AC input terminal L1 of the charge/discharge port 10 and the first AC output terminal A1 of the relay circuit unit 110.

An initial charging resistor may be disposed in series between the first AC input terminal L1 of the charge/discharge port 10 and the precharge relay RLY_PreChg.

The L1-L2 relay RLY_L1_L2 may be disposed in series between the first AC input terminal L1 of the charge/discharge port 10 and a second AC output terminal A2 of the relay circuit 110, and the L2 relay RLY_L2 may be disposed in series between the second AC input terminal L2 of the charge/discharge port 10 and the second AC output terminal A2 of the relay circuit unit 110.

The L3 relay RLY_L3 may be disposed in series between the third AC input terminal L3 of the charge/discharge port 10 and a third AC output terminal A3 of the relay circuit unit 110, and the neutral relay RLY_N_A may be disposed in series between the neutral terminal N of the charge/discharge port 10 and the third AC output terminal A3 of the relay circuit unit 110.

In an exemplary embodiment, an input terminal of the precharge relay RLY_PreChg, an input terminal of the L1 relay RLY_L1, and an input terminal of the L1-L2 relays RLY_L1_L2 may be commonly connected to the first AC input terminal L1.

The first AC output terminal A1 may be a terminal from which the L1 phase AC voltage is output, the second AC output terminal A2 may be a terminal from which the L2 phase AC voltage is output, and the third AC output terminal A3 may be a terminal from which the L3 phase AC voltage is output.

For explanation, an AC input terminal of the relay circuit unit 110 to which the input terminal of the precharge relay RLY_PreChg, the input terminal of the L1 relay RLY_L1, and the input terminal of the L1-L2 relay RLY_L1_L2 are commonly connected is referred to as a common AC input terminal CT.

The relay diagnosis unit (or relay diagnosis apparatus) 500 according to an exemplary embodiment may diagnose the relays within the relay circuit unit 110.

According to an exemplary embodiment, the relay diagnosis unit 500 may include first to fifth voltage sensors 510 to 550 and a diagnosis module 560, but a configuration of the relay diagnosis unit 500 is not necessarily limited thereto.

The first to third voltage sensors 510 to 530 may measure a phase-specific voltage for an AC input to the relay circuit unit 110. For example, the first to third voltage sensors 510 to 530 may measure a phase-specific voltage for an AC between the charge/discharge port 10 and the relay circuit unit 110.

According to an exemplary embodiment, the first voltage sensor 510 may measure a phase voltage (here, an L1 phase voltage) of an AC input through the first AC input terminal L1 of the charge/discharge port 10, the second voltage sensor 520 may measure a phase voltage (here, an L2 phase voltage) of an AC input through the second AC input terminal L2 of the charge/discharge port 10, and the third voltage sensor 530 may measure a phase voltage (here, an L3 phase voltage) of an AC input through the third AC input terminal L3 of the charge/discharge port.

The first voltage sensor 510 may measure a voltage (L1-N voltage) between the first AC input terminal L1 and the neutral terminal N of the charge/discharge port 10, the second voltage sensor 520 may measure a voltage (L2-N voltage) between the second AC input terminal L2 and the neutral terminal N of the charge/discharge port 10, and the third voltage sensor 530 may measure a voltage (L3-N voltage) between the third AC input terminal L3 and the neutral terminal N the third voltage sensor 530 of the charge/discharge port 10.

For example, the first voltage sensor 510 may measure a voltage (L1-N voltage) between a random point between the first AC input terminal L1 of the charge/discharge port 10 and the common AC input terminal CT of the relay circuit unit 110 and a random point between the neutral terminal N of the charge/discharge port 10 and a neutral relay input terminal T3 of the relay circuit unit 110.

For example, the second voltage sensor 520 may measure a voltage (L2-N voltage) between a random point between the second AC input terminal L2 of the charge/discharge port 10 and an L2 relay input terminal T1 of the relay circuit unit 110 and a random point between the neutral terminal N of the charge/discharge port 10 and the neutral relay input terminal T3 of the relay circuit unit 110.

For example, the third voltage sensor 530 may measure a voltage (L3-N voltage) between a random point between the third AC input terminal L3 of the charge/discharge port 10 and an L3 relay input terminal T2 of the relay circuit unit 110 and a random point between the neutral terminal N of the charge/discharge port 10 and the neutral relay input terminal T3 of the relay circuit unit 110.

The fourth and fifth voltage sensors 540 and 550 may measure a line voltage of an AC output from the relay circuit unit 110.

According to an exemplary embodiment, the fourth voltage sensor 540 may measure a voltage between an L1 phase and an L3 phase (L1-L3 line voltage or L1-L3 voltage), and the fifth voltage sensor 550 may measure a voltage between an L2 phase and the L3 phase (L2-L3 line voltage or L2-L3 voltage).

For example, the fourth voltage sensor 540 may measure a voltage (L1-L3 line voltage) between the first AC output terminal A1 and the third AC output terminal A3 of the relay circuit unit 110, and the fifth voltage sensor 550 may measure a voltage (L2-L3 line voltage) between the second AC output terminal A2 and the third AC output terminal A3 of the relay circuit unit 110.

The diagnosis module 560 may diagnose the relays of the relay circuit unit 110, based on the voltages measured by the first to fifth voltage sensors 510 to 550.

According to an exemplary embodiment, the diagnosis module 560 may control an operation of the relay circuit unit 110 to diagnose the relay circuit unit 110.

The diagnosis module 560 may store a relay control algorithm for each diagnosis type and a relay diagnosis algorithm for each diagnosis type.

According to an exemplary embodiment of the present disclosure, diagnosis of a relay in a vehicle OBC may be possible in four types (cases 1, 2, 3, and 7) as shown in Table 1.

Since a charging operation is possible only when a phase voltage to which an initial charging (IC) resistor is connected is applied, cases 4 to 6 in which the L1 phase to which the initial charging resistor is connected is not input are excluded from a diagnosis type.

TABLE 1

| Classification (Type) | L1 phase (Initial charging connection) | L2 phase | L3 phase | Neutral | Diagnosis possibility |
|---|---|---|---|---|---|
| Case 1 | ○ | X | X | ○ | Possible (1-phase operation) |
| Case 2 | ○ | ○ | X | ○ | Possible (1 or 2-phase operation) |
| Case 3 | ○ | X | ○ | ○ | Possible (1 or 2-phase operation) |
| Case 4 | X | ○ | ○ | ○ | Excluded |
| Case 5 | X | ○ | X | ○ | Excluded |
| Case 6 | X | X | ○ | ○ | Excluded |
| Case 7 | ○ | ○ | ○ | ○ | Possible (3-phase operation) |

Figure 4:
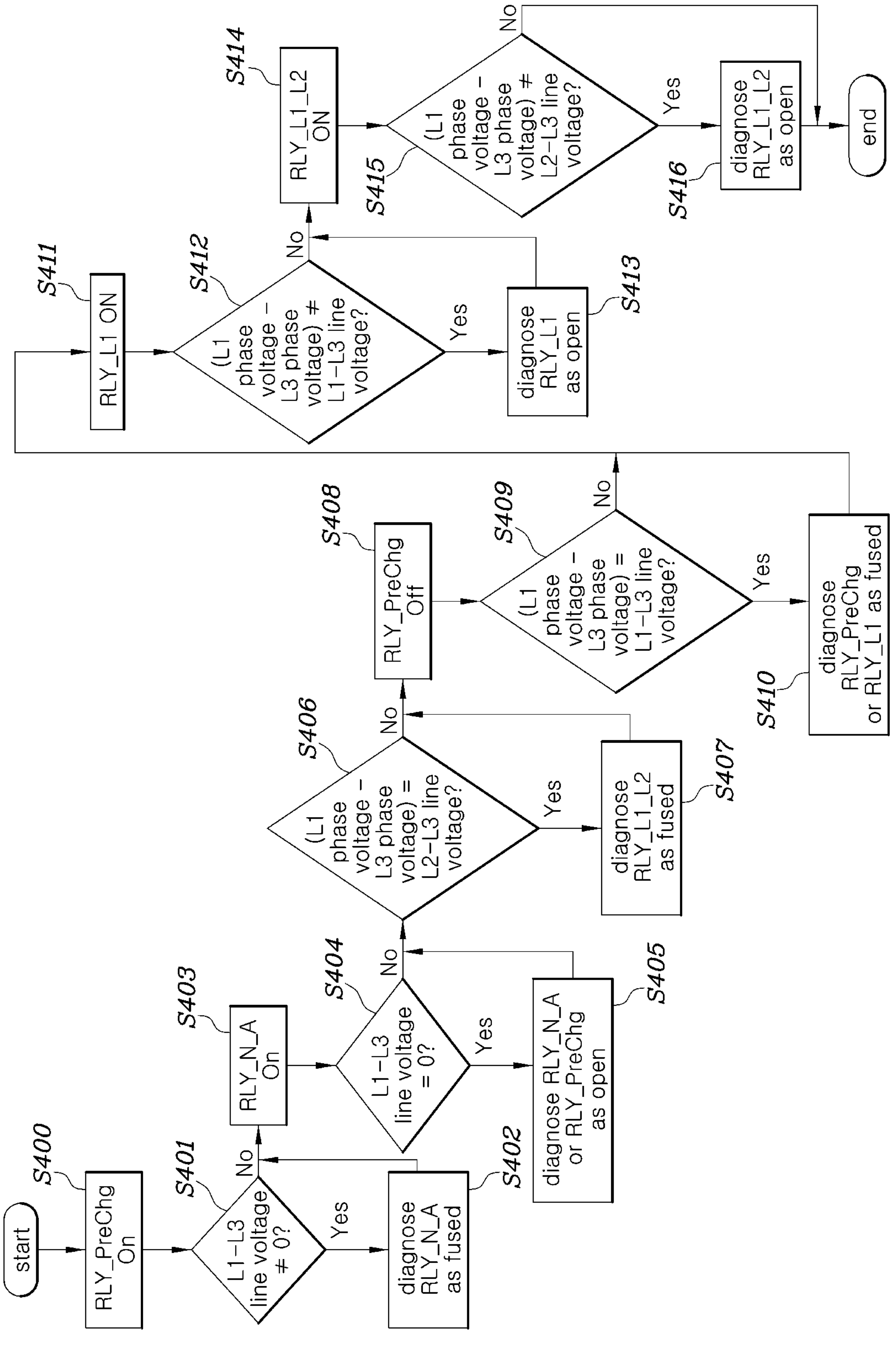
FIG. 4 illustrates a method embodiment for diagnosing a relay in a vehicle OBC performing a single-phase (L1 phase) operation.

FIG. 4 illustrates a method embodiment for diagnosing a relay in a vehicle OBC performing a single-phase (L1 phase) operation.

A method embodiment for diagnosing the relay in the vehicle OBC performing a single-phase (L1 phase) operation is descried with reference to FIG. 4. The method embodiment is described as being performed by the relay diagnosis unit (or relay diagnosis apparatus) 500 for illustration, but may be performed by the controller 600.

First (referring to FIG. 4), the relay diagnosis unit 500 may turn on the precharge relay RLY_PreChg (operation S400), and may determine whether an L1-L3 line voltage is not 0 (operation S401).

When determining that the L1-L3 line voltage is not 0 in operation S401 (S401=Yes), the relay diagnosis unit 500 may diagnose the neutral relay RLY_N_A as being in a fused state (operation S402).

When determining that the L1-L3 line voltage is 0 in operation S401 (S401=No) or diagnosing that the neutral relay RLY_N_A is in the fused state (operation S402), the relay diagnosis unit 500 may turn on the neutral relay RLY_N_A (operation S403), and may determine whether the L1-L3 line voltage is 0 (operation S404).

When determining that the L1-L3 line voltage is 0 in operation S404 (S404=Yes), the relay diagnosis unit 500 may diagnose the neutral relay RLY_N_A or the precharge relay RLY_PreChg as being in an open state (operation S405).

When determining that the L1-L3 line voltage is not 0 in operation S404 (S404=No) or diagnosing the neutral relay RLY_N_A or the precharge relay RLY_PreChg as being in the open state (operation S405), the relay diagnosis unit 500 may determine whether a difference between an L1 phase voltage and an L3 phase voltage is equal to an L2-L3 line voltage (operation S406).

When determining that the difference between the L1 phase voltage and the L3 phase voltage is equal to the L2-L3 line voltage in operation S406 (S406=Yes), the relay diagnosis unit 500 may diagnose the L1-L2 relay RLY_L1_L2 as being in the fused state (operation S407).

When determining that the difference between the L1 phase voltage and the L3 phase voltages is different from the L2-L3 line voltage in operation S406 (S406=No) or diagnosing the L1-L2 relay RLY_L1_L2 as being in the fused state (operation S407), the relay diagnosis unit 500 may turn off the precharge relay RLY_PreChg (operation S408), and may determine whether the difference between the L1 phase voltage and the L3 phase voltage is equal to the L1-L3 line voltage (operation S409).

When determining that the difference between the L1 phase voltage and the L3 phase voltage is equal to the L1-L3 line voltage in operation S409 (S409=Yes), the relay diagnosis unit 500 may diagnose the precharge relay RLY_PreChg or the L1 relay RLY_L1 as being in a fused state (operation S410).

When determining that the difference between the L1 phase voltage and the L3 phase voltage is not equal to the L1-L3 line voltage in operation S409 (S409=No) or diagnosing the precharge relay RLY_PreChg or the L1 relay RLY_L1 as being in the fused state (operation S410), the relay diagnosis unit 500 may turn on the L1 relay RLY_L1 (operation S411), and may determine whether the difference between the L1 phase voltage and the L3 phase voltage is different from the L1-L3 line voltage (operation S412).

When determining that the difference between the L1 phase voltage and the L3 phase voltage is different from the L1-L3 line voltage in operation S412 (S412=Yes), the relay diagnosis unit 500 may diagnose the L1 relay RLY_L1 as being in the open state (operation S413).

When determining that the difference between the L1 phase voltage and the L3 phase voltage is equal to the L1-L3 line voltage in operation S412 (S412=No) or diagnosing the L1 relay RLY_L1 as being in the open state (operation S413), the relay diagnosis unit 500 may turn on the L1-L2 relay RLY_L1_L2 (operation S414), and may determine whether the difference between the L1 phase voltage and the L3 phase voltage is different from the L2-L3 line voltage (operation S415).

When determining that the difference between the L1 phase voltage and the L3 phase voltage is different from the L2-L3 line voltage in operation S415 (S415=Yes), the relay diagnosis unit 500 may diagnose the L1-L2 relay RLY_L1_L2 as being in the open state (operation S416).

When determining that the difference between the L1 phase voltage and the L3 phase voltage is equal to the L2-L3 line voltage in operation S415 (S415=No) or diagnosing the L1-L2 relay RLY_L1_L2 as being in the open state (operation S416), the relay diagnosis unit 500 may terminate a relay diagnosis operation.

According to an exemplary embodiment, when performing relay diagnosis in the L1 phase operation, the relay diagnosis unit 500 may sequentially turn on the precharge relay, turn on the neutral relay, turn off the precharge relay, turn on the L1 relay, and turn on the L1-L2 relay, thereby diagnosing the relays.

When the relay diagnosis unit 500 does not directly control the relays, the relay diagnosis unit 500 may diagnose the relays, based on voltages measured as the precharge relay is turned on, the neutral relay is turned on, the precharge relay is turned off, the L1 relay is turned on, and the L1-L2 relay is turned on, in that order.

According to the method embodiment for diagnosing the relay, the relay diagnosis unit 500 may diagnose the open state and the fused state of the neutral relay RLY_N_A, the open state and the fused state of the L1 relay RLY_L1, the open state and the fused state of the precharge relay RLY_PreChg, and the open state and the fused state of the L1-L2 relay RLY_L1_L2 with respect to the relay in the vehicle OBC performing the single-phase (L1 phase) operation.

According to an exemplary embodiment, when determining diagnosis of an abnormality (diagnosis of fusion or diagnosis of openness) while diagnosing a relay, the relay diagnosis unit 500 may terminate the diagnosis operation without performing a process after determining the diagnosis of the abnormality.

For example, in the method embodiment of FIG. 4, when determining that the neutral relay RLY_N_A is diagnosed as being fused in operation S402 according to determination in operation S401, the relay diagnosis unit 500 may terminate the diagnosis operation without performing a subsequent diagnosis process (operations S403 to S416).

In another example, in the method embodiment of FIG. 4, when determining that the L1_L2 relay RLY_L1_L2 is diagnosed as being fused in operation S407 according to determination in operation S406, the relay diagnosis unit 500 may terminate the diagnosis operation without performing a subsequent diagnosis process (operations S408 to S416).

Figure 5:
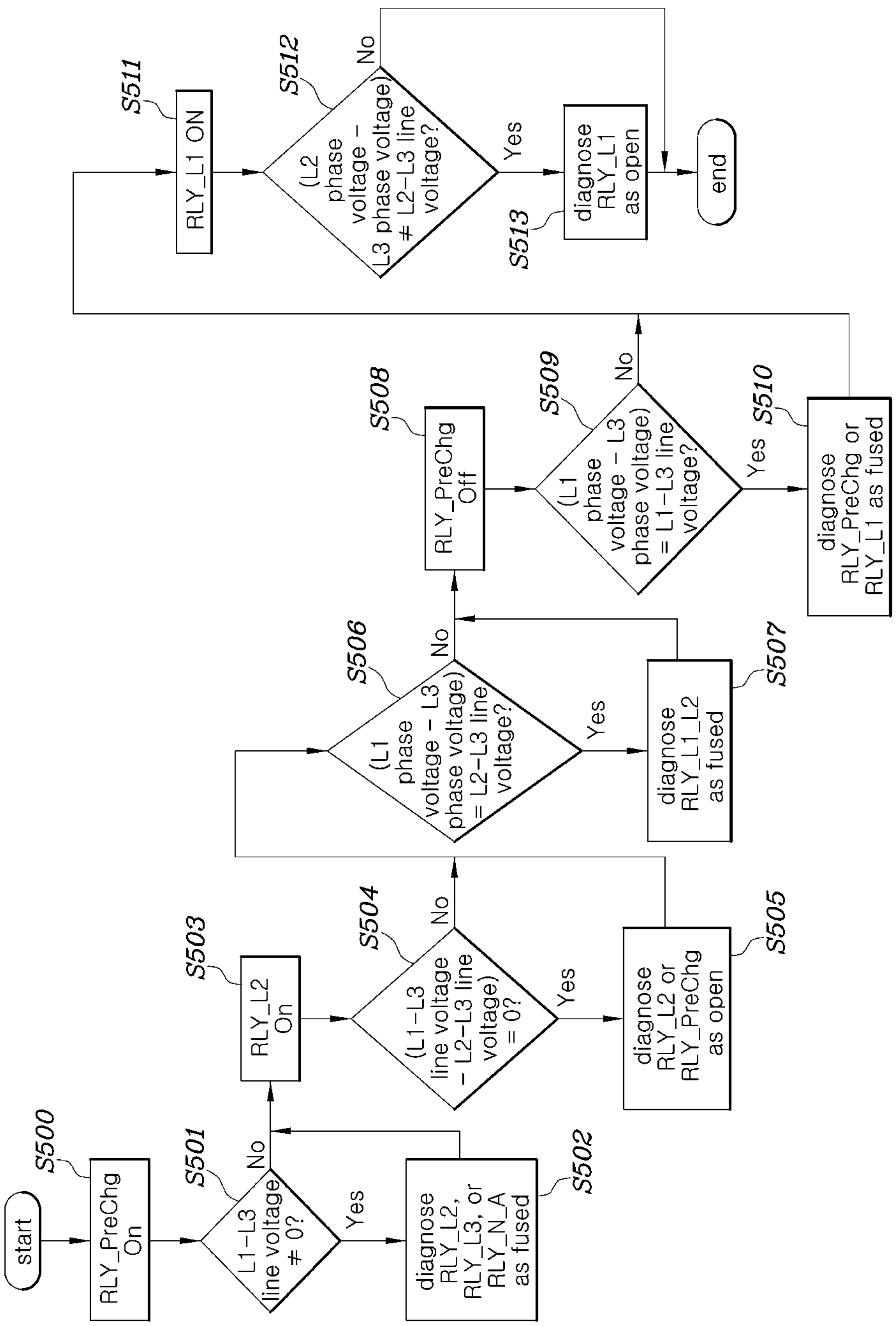
FIG. 5 illustrates a method embodiment for diagnosing a relay in a vehicle OBC performing an L1-L2 phase operation.

FIG. 5 illustrates a method embodiment for diagnosing a relay in a vehicle OBC performing an L1-L2 phase operation.

A method embodiment for diagnosing the relay in the vehicle OBC performing an L1-L2 phase operation is descried with reference to FIG. 5. The method embodiment is described as being performed by the relay diagnosis unit (or relay diagnosis apparatus) 500 for illustration, but may be performed by the controller 600.

First (referring to FIG. 5), the relay diagnosis unit 500 may turn on the precharge relay RLY_PreChg (operation S500), and may determine whether an L1-L3 line voltage is not 0 (operation S501).

When determining that the L1-L3 line voltage is not 0 in operation S501 (S501=Yes), the relay diagnosis unit 500 may diagnose the L2 relay RLY_L2, the L3 relay RLY_L3, or the neutral relay RLY_N_A as being in a fused state (operation S502).

When determining that the L1-L3 line voltage is 0 in operation S501 (S501=No) or diagnosing the L2 relay RLY_L2, the L3 relay RLY_L3, or the neutral relay RLY_N_A as being in the fused state (operation S502), the relay diagnosis unit 500 may turn on the L2 relay RLY_L2 (operation S503), and may determine whether a difference between the L1-L3 line voltage and an L2-L3 line voltage is 0 (operation S504).

When determining that the difference between the L1-L3 line voltage and the L2-L3 line voltage is 0 in operation S504 (S504=Yes), the relay diagnosis unit 500 may diagnose the L2 relay RLY_L2 or the precharge relay RLY_PreChg as being in an open state (operation S505).

When determining that the difference between the L1-L3 line voltage and the L2-L3 line voltage is not 0 in operation S504 (S504=No) or diagnosing the L2 relay RLY_L2 or the precharge relay RLY_PreChg as being in the open state (operation S505), the relay diagnosis unit 500 may determine whether a difference between an L1 phase voltage and an L3 phase voltage is equal to the L2-L3 line voltage (operation S506).

When determining that the difference between the L1 phase voltage and the L3 phase voltage is equal to the L2-L3 line voltage in operation S506 (S506=Yes), the relay diagnosis unit 500 may diagnose the L1-L2 relay RLY_L1_L2 as being in a fused state (operation S507).

When determining that the difference between the L1 phase voltage and the L3 phase voltages is not equal to the L2-L3 line voltage in operation S506 (S506=No) or diagnosing the L1-L2 relay RLY_L1_L2 as being in a fused state (operation S507), the relay diagnosis unit 500 may turn off the precharge relay RLY_PreChg (operation S508), and may determine whether the difference between the L1 phase voltage and the L3 phase voltage is equal to the L1-L3 line voltage (operation S509).

When determining that the difference between the L1 phase voltage and the L3 phase voltage is equal to the L1-L3 line voltage in operation S509 (S509=Yes), the relay diagnosis unit 500 may diagnose the precharge relay RLY_PreChg or the L1 relay RLY_L1 as being in a fused state (operation S510).

When determining that the difference between the L1 phase voltage and the L3 phase voltage is not equal to the L1-L3 line voltage in operation S509 (S509=No) or diagnosing the precharge relay RLY_PreChg or the L1 relay RLY_L1 as being in a fused state (operation S510), the relay diagnosis unit 500 may turn on the L1 relay RLY_L1 (operation S511), and may determine whether a difference between an L2 phase voltage and the L3 phase voltage is different from the L2-L3 line voltage (operation S512).

When determining that the difference between the L2 phase voltage and the L3 phase voltage is different from the L2-L3 line voltage in operation S512 (S512=Yes), the relay diagnosis unit 500 may diagnose the L1 relay RLY_L1 as being in an open state (operation S513).

When determining that the difference between the L2 phase voltage and the L3 phase voltage is equal to the L2-L3 line voltage in operation S512 (S512=No) or diagnosing the L1 relay RLY_L1 as being in an open state (operation S513), the relay diagnosis unit 500 may terminate a relay diagnosis operation.

According to an exemplary embodiment, when performing relay diagnosis in the L1-L2 phase operation, the relay diagnosis unit 500 may sequentially turn on the precharge relay, turn on the L2 relay, turn off the precharge relay, and turn on the L1 relay, thereby diagnosing the relays.

When the relay diagnosis unit 500 does not directly control the relays, the relay diagnosis unit 500 may diagnose the relays, based on voltages measured as the precharge relay is turned on, the L2 relay is turned on, the precharge relay is turned off, and the L1 relay is turned on, in that order.

According to a method embodiment for diagnosing the relay, the relay diagnosis unit 500 may diagnose the open state and the fused state of the precharge relay RLY_PreChg, the open state and the fused state of the L1 relay RLY_L1, the open state and the fused state of the L2 relay RLY_L2, the fused state of the neutral relay RLY_N_A, and the fused state of the L1-L2 relay RLY_L1_L2 with respect to the relay in the vehicle OBC performing the L1-L2 phase operation.

According to an exemplary embodiment, when determining diagnosis of an abnormality (diagnosis of fusion or diagnosis of openness) while diagnosing a relay, the relay diagnosis unit 500 may terminate the diagnosis operation without performing a process after determining the diagnosis of the abnormality.

For example, in the method embodiment of FIG. 5, when determining that the L1-L2 relay RLY_L1_L2 is diagnosed as being fused in operation S507 according to determination in operation S506, the relay diagnosis unit 500 may terminate the diagnosis operation without performing a subsequent diagnosis process (operations S508 to S513).

Figure 6:
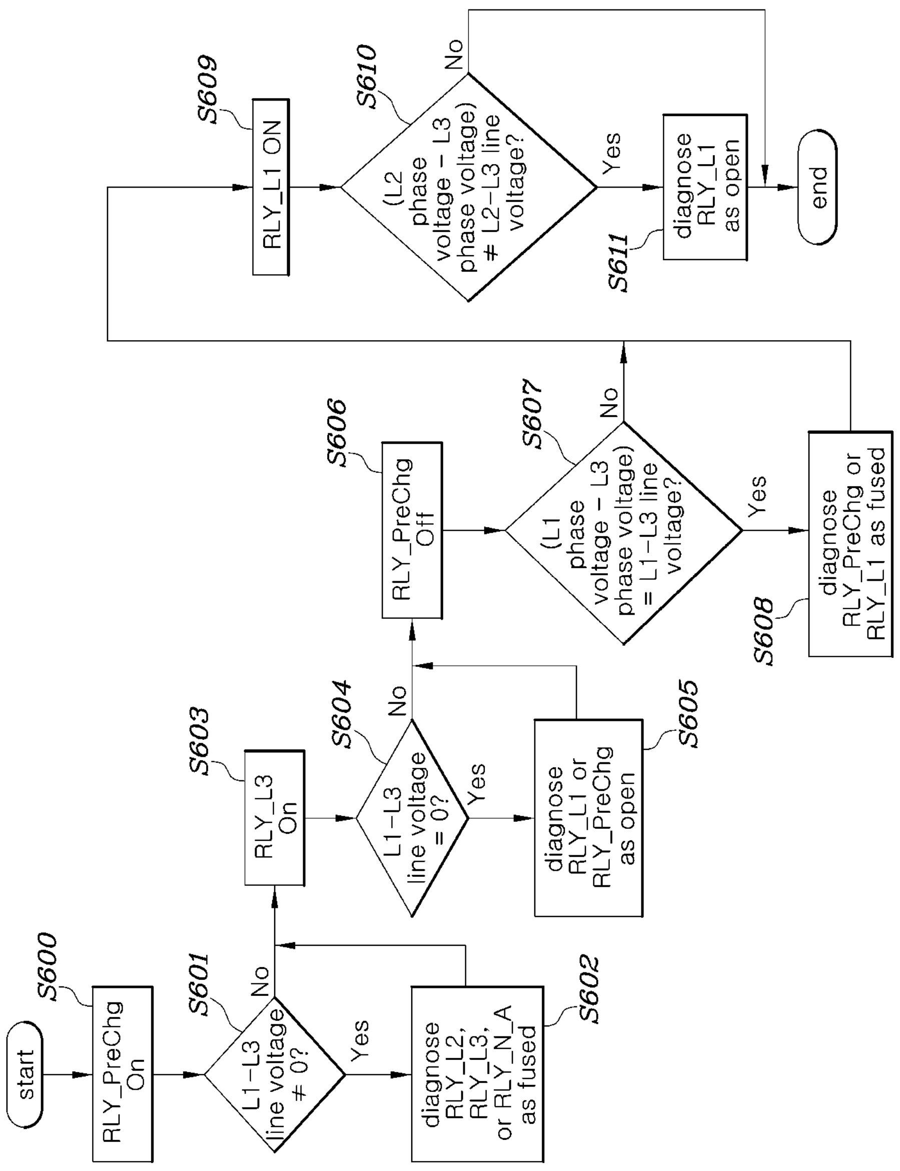
FIG. 6 illustrates a method embodiment for diagnosing a relay in a vehicle OBC performing an L1-L3 phase operation.

FIG. 6 illustrates a method embodiment for diagnosing a relay in a vehicle OBC performing an L1-L3 phase operation.

A method embodiment for diagnosing a relay in the vehicle OBC performing the L1-L3 phase operation is descried with reference to FIG. 6. The method embodiment is described as being performed by the relay diagnosis unit (or relay diagnosis apparatus) 500 for illustration, but may be performed by the controller 600.

First (referring to FIG. 6), the relay diagnosis unit 500 may turn on the precharge relay RLY_PreChg (operation S600), and may determine whether an L1-L3 line voltage is not 0 (operation S601).

When determining that the L1-L3 line voltage is not 0 in operation S601 (S601=Yes), the relay diagnosis unit 500 may diagnose the L2 relay RLY_L2, the L3 relay RLY_L3, or the neutral relay RLY_N_A as being in a fused state (operation S602).

When determining that the L1-L3 line voltage is 0 in operation S601 (S601=No) or diagnosing the L2 relay RLY_L2, the L3 relay RLY_L3, or the neutral relay RLY_N_A as being in a fused state (operation S602), the relay diagnosis unit 500 may turn on the L3 relay RLY_L3 (operation S603), and may determine whether the L1-L3 line voltage is 0 (operation S604).

When determining that the L1-L3 line voltage is 0 in operation S604 (S604=Yes), the relay diagnosis unit 500 may diagnose the L1 relay RLY_L1 or the precharge relay RLY_PreChg as being in an open state (operation S605).

When determining that the L1-L3 line voltage is not 0 in operation S604 (S604=No) or diagnosing the L1 relay RLY_L1 or the precharge relay RLY_PreChg as being in an open state (operation S605), the relay diagnosis unit 500 may turn off the precharge relay RLY_PreChg (operation S606), and may determine whether a difference between an L1 phase voltage and an L3 phase voltage is equal to the L1-L3 line voltage (operation S607).

When determining that the difference between the L1 phase voltage and the L3 phase voltage is equal to the L1-L3 line voltage in operation S607 (S607=Yes), the relay diagnosis unit 500 may diagnose the precharge relay RLY_PreChg or the L1 relay RLY_L1 as being in a fused state (operation S608).

When determining that the difference between the L1 phase voltage and the L3 phase voltage is not equal to the L1-L3 line voltage in operation S607 (S607=No) or diagnosing the precharge relay RLY_PreChg or the L1 relay RLY_L1 as being in a fused state (operation S608), the relay diagnosis unit 500 may turn on the L1 relay RLY_L1 (operation S609), and may determine whether a difference between an L2 phase voltage and the L3 phase voltage is different from an L2-L3 line voltage (operation S610).

When determining that the difference between the L2 phase voltage and the L3 phase voltage is different from the L2-L3 line voltage in operation S610 (S610=Yes), the relay diagnosis unit 500 may diagnose the L1 relay RLY_L1 as being in an open state (operation S611).

When determining that the difference between the L2 phase voltage and the L3 phase voltage is equal to the L2-L3 line voltage in operation S610 (S610=No) or diagnosing the L1 relay RLY_L1 as being in an open state (operation S611), the relay diagnosis unit 500 may terminate a relay diagnosis operation.

According to an exemplary embodiment, when performing relay diagnosis in an L1-L3 phase operation, the relay diagnosis unit 500 may sequentially turn on the precharge relay, turn on the L3 relay, turn off the precharge relay, and turn on the L1 relay, thereby diagnosing the relays.

When the relay diagnosis unit 500 does not directly control the relays, the relay diagnosis unit 500 may diagnose the relays, based on voltages measured as the precharge relay is turned on, the L3 relay is turned on, the precharge relay is turned off, and the L1 relay is turned on, in that order.

According to a method embodiment for diagnosing a relay, the relay diagnosis unit 500 may diagnose the open state and the fused state of the L1 relay RLY_L1, the open state and the fused state of the precharge relay RLY_PreChg, the open state and the fused state of the L3 relay RLY_L3, the open state of the L2 relay RLY_L2, and the fused state of the neutral relay RLY_N_A, with respect to the relay in the vehicle OBC performing the L1-L3 phase operation.

According to an exemplary embodiment, when determining diagnosis of an abnormality (diagnosis of fused state or diagnosis of openness) while diagnosing a relay, the relay diagnosis unit 500 may terminate the diagnosis operation without performing a process after determining the diagnosis of the abnormality.

For example, for the method embodiment of FIG. 6, when determining that the L1 relay RLY_L1 or the precharge relay RLY_PreChg is diagnosed as being open in operation S605 according to determination in operation S604, the relay diagnosis unit 500 may terminate the diagnosis operation without performing a subsequent diagnosis process (operations S606 to S611).

Figure 7:
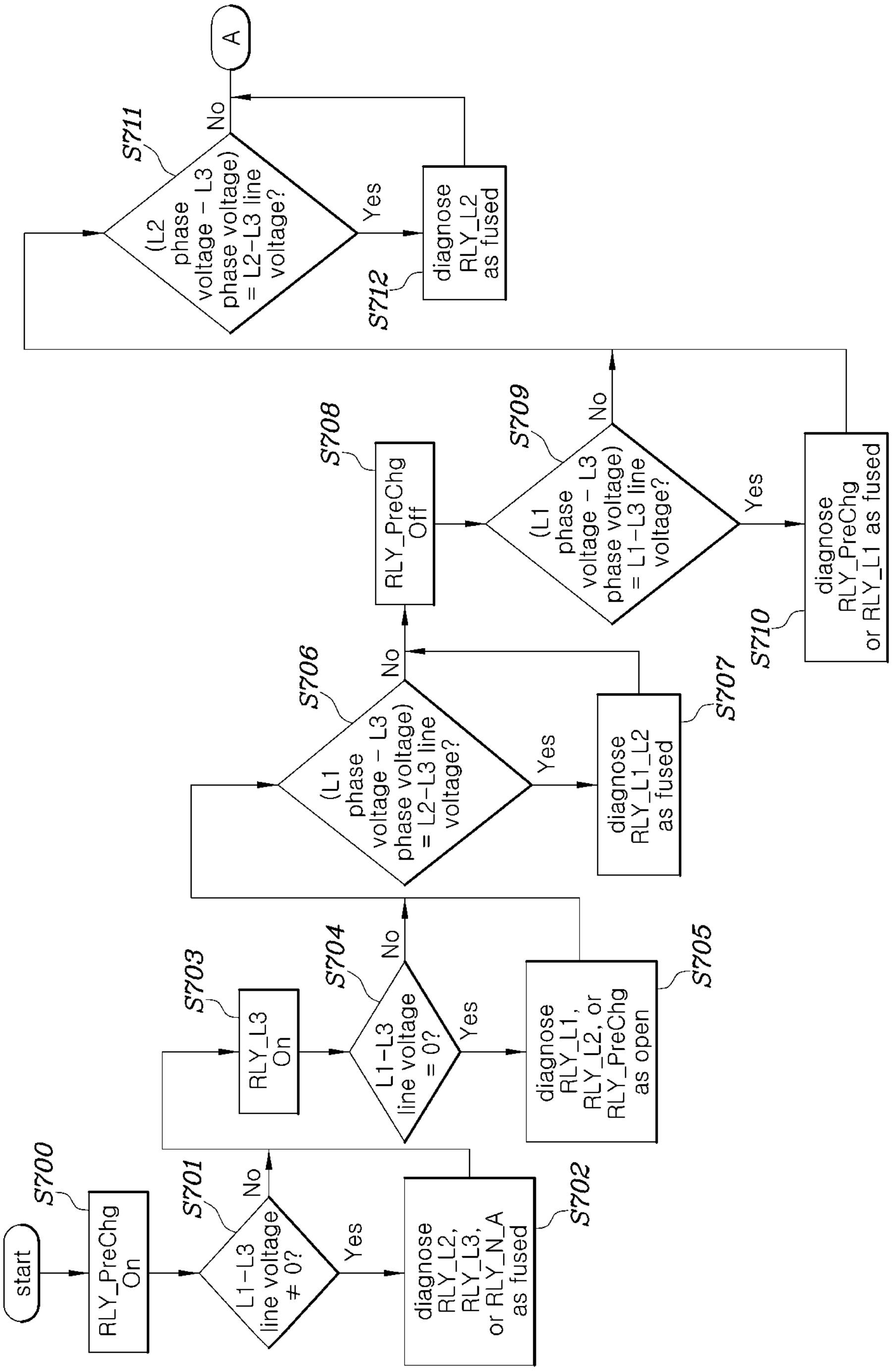
FIG. 7 and FIG. 8 illustrate a method embodiment for diagnosing a relay in a vehicle OBC performing a three-phase operation.
Figure 8:
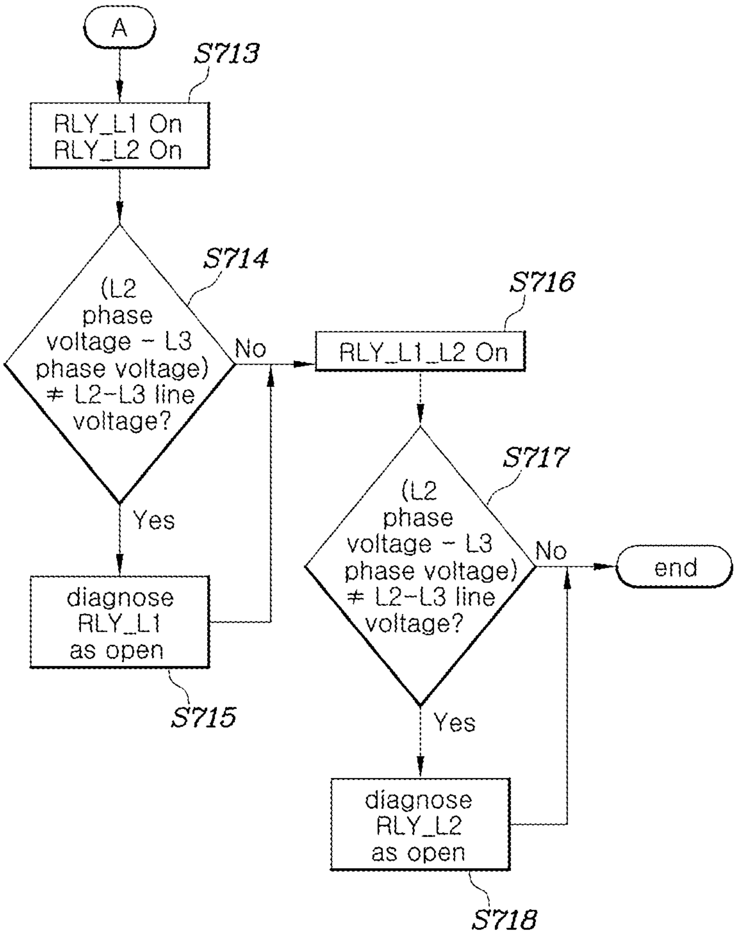

FIG. 7 and FIG. 8 illustrate a method embodiment for diagnosing a relay in a vehicle OBC performing a three-phase operation.

A method embodiment for diagnosing a relay in the vehicle OBC performing the three-phase operation is descried with reference to FIG. 7 and FIG. 8. A method embodiment is described in FIGS. 7 and 8 as being performed by the relay diagnosis unit (or relay diagnosis apparatus) 500 for illustration, but may be performed by the controller 600.

First (referring to FIGS. 7 and 8), the relay diagnosis unit 500 may turn on the precharge relay RLY_PreChg (operation S700), and may determine whether an L1-L3 line voltage is not 0 (operation S701).

When determining that the L1-L3 line voltage is not 0 in operation S701 (S701=Yes), the relay diagnosis unit 500 may diagnose the L2 relay RLY_L2, the L3 relay RLY_L3, or the neutral relay RLY_N_A as being in a fused state (operation S702).

When determining that the L1-L3 line voltage is 0 in operation S701 (S701=No) or diagnosing the L2 relay RLY_L2, the L3 relay RLY_L3, or the neutral relay RLY_N_A as being in a fused state (operation S702), the relay diagnosis unit 500 may turn on the L3 relay RLY_L3 (operation S703), and may determine whether the L1-L3 line voltage is 0 (operation S704).

When determining that the L1-L3 line voltage is 0 in operation S704 (S704=Yes), the relay diagnosis unit 500 may diagnose the L1 relay RLY_L1, the L2 relay RLY_L2, or the precharge relay RLY_PreChg as being in an open state (operation S705).

When determining that the L1-L3 line voltage is not 0 in operation S704 (S704=No) or diagnosing the L1 relay RLY_L1, the L2 relay RLY_L2, or the precharge relay RLY_PreChg as being in an open state (operation S705), the relay diagnosis unit 500 may determine whether a difference between an L1 phase voltage and an L3 phase voltage is equal to an L2-L3 line voltage (operation S706).

When determining that the difference between the L1 phase voltage and the L3 phase voltage is equal to the L2-L3 line voltage in operation S706 (S706=Yes), the relay diagnosis unit 500 may diagnose the L1-L2 relay RLY_L1_L2 as being in a fused state (operation S707).

When determining that the difference between the L1 phase voltage and the L3 phase voltage is different from the L2-L3 line voltage in operation S706 (S706=No) or diagnosing the L1-L2 relay RLY_L1_L2 as being in a fused state (operation S707), the relay diagnosis unit 500 may turn off the precharge relay RLY_PreChg (operation S708), and may determine whether that the difference between the L1 phase voltage and the L3 phase voltage is equal to the L1-L3 line voltage (operation S709).

When determining that the difference between the L1 phase voltage and the L3 phase voltage is equal to the L1-L3 line voltage in operation S709 (S709=Yes), the relay diagnosis unit 500 may diagnose the precharge relay RLY_PreChg or the L1 relay RLY_L1 as being in a fused state (operation S710).

When determining that the difference between the L1 phase voltage and the L3 phase voltage is different from the L1-L3 line voltage in operation S709 (S709=No) or diagnosing the precharge relay RLY_PreChg or the L1 relay RLY_L1 as being in a fused state (operation S710), the relay diagnosis unit 500 may determine whether a difference between an L2 phase voltage and the L3 phase voltage is equal to the L2-L3 line voltage (operation S711).

When determining that the difference between the L2 phase voltage and the L3 phase voltage is equal to the L2-L3 line voltage in operation S711 (S711=Yes), the relay diagnosis unit 500 may diagnose the L2 relay RLY_L2 as being in a fused state (operation S712).

When determining that the difference between the L2 phase voltage and the L3 phase voltage is different from the L2-L3 line voltage in operation S711 (S711=No) or diagnosing the L2 relay RLY_L2 as being in a fused state (operation S712), the relay diagnosis unit 500 may turn on the L1 relay RLY_L1 and the L2 relay RLY_L2 (operation S713), and may determine whether the difference between the L2 phase voltage and the L3 phase voltage is different from the L2-L3 line voltage (operation S714).

When determining that the difference between the L2 phase voltage and the L3 phase voltage is different from the L2-L3 line voltage in operation S714 (S714=Yes), the relay diagnosis unit 500 may diagnose the L1 relay RLY_L1 as being in an open state (operation S715).

When determining that the difference between the L2 phase voltage and the L3 phase voltage is not different from the L2-L3 line voltage in operation S714 (S714=No) or diagnosing the L1 relay RLY_L1 as being in an open state (operation S715), the relay diagnosis unit 500 may turn on the L1-L2 relay RLY_L1_L2 (operation S716), and may determine whether the difference between the L2 phase voltage and the L3 phase voltage is different from the L2-L3 line voltage (operation S717).

When determining that the difference between the L2 phase voltage and the L3 phase voltage is different from the L2-L3 line voltage in operation S717 (S717=Yes), the relay diagnosis unit 500 may diagnose the L2 relay RLY_L2 as being in an open state (operation S718), and may terminate a relay diagnosis operation.

When determining that the difference between the L2 phase voltage and the L3 phase voltage is equal to the L2-L3 line voltage in operation S717 (S717=No), the relay diagnosis unit 500 may terminate the relay diagnosis operation.

According to an exemplary embodiment, when performing relay diagnosis in the three-phase operation, the relay diagnosis unit 500 may sequentially turn on the precharge relay, turn on the L3 relay, turn off the precharge relay, turn on the L1 relay and the L2 relay, and turn on the L1_L2 relay, thereby diagnosing the relays.

When the relay diagnosis unit 500 does not directly control the relays, the relay diagnosis unit 500 may diagnose the relays, based on voltages measured as the precharge relay is turned on, the L3 relay is turned on, the precharge relay is turned off, the L1 relay and the L2 relay are turned on, and the L1_L2 relay is turned on, in that order.

According to a method embodiment for diagnosing a relay, the relay diagnosis unit 500 may diagnose the open state and the fused state of the precharge relay RLY_PreChg, the open state and the fused state of the L1 relay RLY_L1, the open state and the fused state of the L2 relay RLY_L2, the open state and the fused state of the L3 relay RLY_L3, the fused state of the L1_L2 relay RLY_L1_L2, and the fused state of the neutral relay RLY_N_A with respect to the relay in the vehicle OBC performing the three-phase operation.

According to an exemplary embodiment, when determining diagnosis of an abnormality (diagnosis of a fused state or diagnosis of openness) while diagnosing a relay, the relay diagnosis unit 500 may terminate the diagnosis operation without performing a process after determining the diagnosis of the abnormality.

For example, for the method embodiment of FIGS. 7 and 8, when determining that the L1_L2 relay RLY_L1_L2 is diagnosed as being fused in operation S707 according to determination in operation S706, the relay diagnosis unit 500 may terminate the diagnosis operation without performing a subsequent diagnosis process (operations S708 to S718).

As described above, using a method for diagnosing a relay in a vehicle OBC according to an exemplary embodiment of the present disclosure makes it possible to diagnose a relay in a vehicle OBC performing a single-phase (L1 phase) operation, a relay in a vehicle OBC performing an L1-L2 phase operation, a relay in a vehicle OBC performing an L1-L3 phase operation, and a relay in a vehicle OBC performing a three-phase operation.

Items to be diagnosed using a method for diagnosing a relay in a vehicle OBC according to an exemplary embodiment of the present disclosure are listed in Table 2.

TABLE 2

| Diagnostic items | Single phase | L1-L2 phase | L1-L3 phase | 3 phase |
|---|---|---|---|---|
| RLY_PreChg open | ○ | ○ | ○ | ○ |
| RLY_PreChg fused | ○ | ○ | ○ | ○ |
| RLY_N_A open | ○ | X | X | X |
| RLY_N_A fused | ○ | ○ | ○ | ○ |
| RLY_L1 open | ○ | ○ | ○ | ○ |
| RLY_L1 fused | ○ | ○ | ○ | ○ |
| RLY_L2 open | X | ○ | ○ | ○ |
| RLY_L2 fused | X | ○ | X | ○ |
| RLY_L3 open | X | X | ○ | ○ |
| RLY_L3 fused | X | X | ○ | ○ |
| RLY_L1_L2 open | ○ | X | X | X |
| RLY_L1_L2 fused | ○ | ○ | X | ○ |

Although embodiments of the present disclosure have been described above with reference to the accompanying drawings, the present disclosure is not necessarily limited to these embodiments and various modifications and changes may be made thereto without departing from the technical ideas of the present disclosure. Therefore, the embodiments disclosed herein are not intended to necessarily limit the technical ideas of the present disclosure but intended to explain the technical ideas of the present disclosure, and the scope of the technical ideas of the present disclosure is not necessarily limited by these embodiments. Accordingly, the embodiments as described above should be construed as being illustrative and not-necessarily-limitative. The scope of protection of the present disclosure should be defined by the appended claims, and all technical ideas equivalent to the claims shall be construed as falling within the scope of protection of the present disclosure.

What is claimed is:

1. An apparatus for diagnosing a relay in a vehicle on-board charger (OBC), which is an apparatus for diagnosing a relay circuit unit located in the vehicle OBC and the relay circuit unit comprises a plurality of relays, the apparatus comprising:

a first voltage sensor to a third voltage sensor, each of the first to third voltage sensors being configured to measure a phase-specific voltage for an AC input to the relay circuit unit;

a fourth voltage sensor and a fifth voltage sensor, each of the fourth to fifth voltage sensors being configured to measure a line voltage for an AC output from the relay circuit unit; and a diagnosis module configured to diagnose the relay circuit unit, based on the phase-specific voltages measured by the first to third voltage sensors, and based on the line voltages measured by the fourth and fifth voltage sensors.

2. The apparatus of claim 1, wherein the first to third voltage sensors are configured to measure voltages for an L1 phase to an L3 phase, respectively, input through first to third AC input terminals, wherein the fourth voltage sensor is configured to measure an L1-L3 line voltage between an L1 phase output through a first AC output terminal of the relay circuit unit and an L3 phase output through a third AC output terminal of the relay circuit unit, and wherein the fifth voltage sensor is configured to measure an L2-L3 line voltage between an L2 phase output through a second AC output terminal of the relay circuit unit and the L3 phase output through the third AC output terminal of the relay circuit unit.

3. The apparatus of claim 1, further comprising:

a first AC input terminal is configured to input an L1 phase voltage;

a second AC input terminal is configured to input an L2 phase voltage;

a third AC input terminal is configured to input an L3 phase voltage;

a first AC output terminal of the relay circuit unit, the first AC output terminal being configured to output the L1 phase voltage;

a second AC output terminal of the relay circuit unit, the second AC output terminal being configured to output the L1 phase voltage or the L2 phase voltage; and a third AC output terminal of the relay circuit unit, the third AC output terminal being configured to output the L3 phase voltage or a ground input, wherein the relay circuit unit comprises:

a precharge relay and an L1 relay coupled in parallel between the first AC input terminal and the first AC output terminal, an L1-L2 relay coupled between the first AC input terminal and the second AC output terminal, an L2 relay coupled between the second AC input terminal and the second AC output terminal, an L3 relay coupled between the third AC input terminal and the third AC output terminal, and a neutral relay coupled between a ground terminal and the third AC output terminal.

4. The apparatus of claim 1, wherein the diagnosis module is configured to perform one of or any combination of relay diagnosis in an L1 phase operation, relay diagnosis in an L1-L2 phase operation, relay diagnosis in an L1-L3 phase operation, and relay diagnosis in a three-phase operation.

5. The apparatus of claim 3, wherein the diagnosis module is configured to diagnose an open state and a fused state of the neutral relay, an open state and a fused state of the L1 relay, an open state and a fused state of the precharge relay, and an open state and a fused state of the L1-L2 relay, by performing relay diagnosis in an L1 phase operation.

6. The apparatus of claim 3, wherein the diagnosis module is configured to diagnose an open state and a fused state of the precharge relay, an open state and a fused state of the L1 relay, an open state and a fused state of the L2 relay, a fused state of the neutral relay, and a fused state of the L1-L2 relay, by performing relay diagnosis in an L1-L2 phase operation.

7. The apparatus of claim 3, wherein the diagnosis module is configured to diagnose an open state and a fused state of the L1 relay, an open state and a fused state of the precharge relay, an open state and a fused state of the L3 relay, an open state of the L2 relay, and a fused state of the neutral relay, by performing relay diagnosis in an L1-L3 phase operation.

8. The apparatus of claim 3, wherein the diagnosis module is configured to diagnose an open state and a fused state of the precharge relay, an open state and a fused state of the L1 relay, an open state and a fused state of the L2 relay, an open state and a fused state of the L3 relay, a fused state of the L1-L2 relay, and a fused state of the neutral relay, by performing relay diagnosis in a three-phase operation.

9. The apparatus of claim 3, wherein the diagnosis module is configured to, when performing relay diagnosis in an L1 phase operation, perform the relay diagnosis, based on voltages measured as, first the precharge relay is turned on, second the neutral relay is turned on, third the precharge relay is turned off, fourth the L1 relay is turned on, and fifth the L1-L2 relay is turned on.

10. The apparatus of claim 3, wherein the diagnosis module is configured to, when performing relay diagnosis in an L1-L2 phase operation, perform the relay diagnosis, based on voltages measured as, first the precharge relay is turned on, second the L2 relay is turned on, third the precharge relay is turned off, and fourth the L1 relay is turned on.

11. The apparatus of claim 3, wherein the diagnosis module is configured to, when performing relay diagnosis in an L1-L3 phase operation, perform the relay diagnosis, based on voltages measured as, first the precharge relay is turned on, second the L3 relay is turned on, third the precharge relay is turned off, and fourth the L1 relay is turned on.

12. The apparatus of claim 3, wherein the diagnosis module is configured to, when performing relay diagnosis in a three-phase operation, perform the relay diagnosis, based on voltages measured as, first the precharge relay is turned on, second the L3 relay is turned on, third the precharge relay is turned off, fourth the L1 relay and the L2 relay are turned on, and fifth the L1-L2 relay is turned on.

13. A method for diagnosing a relay circuit unit in a vehicle on-board charger (OBC), the method comprising:

measuring phase-specific voltages for AC inputs to the relay circuit unit by using first to third voltage sensors;

measuring line voltages for AC outputs from the relay circuit unit by using fourth and fifth voltage sensors; and diagnosing the relay circuit unit, based on the phase-specific voltages measured by the first to third voltage sensors and based on the line voltages measured by the fourth and fifth voltage sensors.

14. The method of claim 13, comprising performing one of or any combination of relay diagnosis in an L1 phase operation, relay diagnosis in an L1-L2 phase operation, relay diagnosis in an L1-L3 phase operation, and relay diagnosis in a three-phase operation, based on the phase-specific voltages and the line voltages.

15. The method of claim 13, wherein, when performing relay diagnosis in an L1 phase operation, the relay diagnosis is performed based on voltages measured as, first a precharge relay is turned on, second a neutral relay is turned on, third the precharge relay is turned off, fourth an L1 relay is turned on, and fifth an L1-L2 relay is turned on.

16. The method of claim 13, wherein, when performing relay diagnosis in an L1-L2 phase operation, the relay diagnosis is performed based on voltages measured as, first a precharge relay is turned on, second an L2 relay is turned on, third the precharge relay is turned off, and fourth an L1 relay is turned on.

17. The method of claim 13, wherein, when performing relay diagnosis in an L1-L3 phase operation, the relay diagnosis is performed based on voltages measured as, first a precharge relay is turned on, second an L3 relay is turned on, third the precharge relay is turned off, and fourth an L1 relay is turned on.

18. The method of claim 13, wherein, when performing relay diagnosis in a three-phase operation, the relay diagnosis is performed based on voltages measured as, first a precharge relay is turned on, second an L3 relay is turned on, third the precharge relay is turned off, fourth an L1 relay and an L2 relay are turned on, and fifth an L1_L2 relay is turned on.

19. A battery charging apparatus comprising:

an input circuit comprising a relay circuit unit located in a vehicle on-board charger (OBC), wherein the relay circuit unit comprises a plurality of relays; and a relay diagnosis unit configured to diagnose the relay circuit unit, wherein the relay diagnosis unit comprises:

a first voltage sensor configured to measure a first phase-specific voltage for a first AC input to the relay circuit unit, a second voltage sensor configured to measure a second phase-specific voltage for a second AC input to the relay circuit unit, a third voltage sensor configured to measure a third phase-specific voltage for a third AC input to the relay circuit unit, a fourth voltage sensor configured to measure a first line voltage for a first AC output from the relay circuit unit, a fifth voltage sensor configured to measure a second line voltage for a second AC output from the relay circuit unit, and a diagnosis module configured to diagnose the relay circuit unit, based on the phase-specific voltages measured by the first to third voltage sensors and based on the line voltages measured by the fourth and fifth voltage sensors.

20. The apparatus of claim 19, wherein the relay diagnosis unit is configured to perform diagnosis, based on voltages measured by controlling an operation of the plurality of relays in the relay circuit unit.

* * * * *